United States Patent [19]

Otto

[11] Patent Number: 4,494,027
[45] Date of Patent: Jan. 15, 1985

[54] DYNAMOELECTRIC MACHINE WITH SELF-ADJUSTING BEARING

[75] Inventor: Charles W. Otto, DeKalb, Ill.

[73] Assignee: General Electric Company, Fort Wayne, Ind.

[21] Appl. No.: 611,580

[22] Filed: May 18, 1984

Related U.S. Application Data

[62] Division of Ser. No. 377,554, May 12, 1982, Pat. No. 4,466,165.

[51] Int. Cl.³ .................. H02K 5/00; H02K 5/16
[52] U.S. Cl. .......................... 310/89; 310/90; 384/208
[58] Field of Search .................. 310/89–91; 384/206–212; 277/136, 137

[56] References Cited

U.S. PATENT DOCUMENTS

| | | | |
|---|---|---|---|
| 2,093,800 | 9/1937 | May | 308/168 |
| 2,478,856 | 8/1949 | Beaver | 75/22 |
| 2,825,608 | 3/1958 | Abel | 384/208 |
| 2,845,552 | 7/1958 | Robinson | 310/90 |
| 2,897,024 | 7/1959 | Chenea | 308/201 |
| 2,937,058 | 5/1960 | Boggs | 308/132 |
| 3,109,684 | 11/1963 | Tupper | 308/121 |
| 3,166,959 | 1/1965 | Tupper | 78/1 |
| 3,286,792 | 11/1966 | Wall | 184/6 |
| 3,419,957 | 1/1969 | Stone | 310/89 X |
| 3,439,964 | 4/1969 | Stone et al. | 384/208 |
| 3,463,949 | 8/1969 | Stone | 310/89 X |
| 3,514,168 | 5/1970 | Otto | 308/132 |
| 4,330,910 | 5/1982 | Schachl et al. | 29/90 |
| 4,411,545 | 10/1983 | Roberge | 384/208 X |
| 4,456,845 | 6/1984 | Cunningham | 310/90 |

FOREIGN PATENT DOCUMENTS

| | | |
|---|---|---|
| 2808919 | 9/1979 | Fed. Rep. of Germany . |
| 1215355 | 12/1970 | United Kingdom . |
| 2041109A | 9/1980 | United Kingdom . |

Primary Examiner—Mark O. Budd
Attorney, Agent, or Firm—Joseph E. Papin

[57] ABSTRACT

A dynamoelectric machine has at least one sheet metal end shield including a partial spherical bearing seating surface deformed therefrom and a set of keys also integrally deformed from the end shield so as to extend generally radially of the partial spherical bearing seating surface. A self-adjusting bearing includes a bearing surface interposed between a pair of opposite end portions of the bearing and extending generally circumferentially thereabout with the bearing surface being disposed in at least limited self-adjusting engagement with the partial spherical bearing seating surface. A set of keyways in one of the opposite end portions of the bearing extend generally radially thereof to intersect with the bearing surface and receive the keys deformed from the end shield in rotational displacement preventing engagement, respectively.

5 Claims, 13 Drawing Figures

DYNAMOELECTRIC MACHINE WITH SELF-ADJUSTING BEARING

CROSS-REFERENCE TO RELATED APPLICATION

This application is a division of U.S. patent application Ser. No. 377,554 filed May 12, 1982 and now U.S. Pat. No. 4,466,165, and is related to the commonly assigned Charles W. Otto U.S. patent application Ser. No. (377,678) filed May 12, 1982 (now abandoned), each of the aforementioned applications is incorporated herein by reference.

FIELD OF THE INVENTION

This application relates in general to prime movers and in particular to an improved dynamoelectric machine.

BACKGROUND OF THE INVENTION

In the past, many different types of bearings were utilized to journal a rotatable assembly of a dynamoelectric machine, and many different schemes were employed to transmit to such bearings a thrust force engendered in response to the rotation of the rotatable assembly when the dynamoelectric machine was energized across a power source.

To avoid the obvious disadvantageous or undesirable feature of the cost involved in employing ball or roller bearings in a dynamoelectric machine, many of the past dynamoelectric machines utilized a sliding type of bearing, such as a generally tubular sleeve bearing or self-aligning bearing for instance, when the duty or application of such past dynamoelectric machines was conducive to the use of such sliding type bearing. However, it is believed that a simple, low cost, dependable and durable sliding type bearing which both journals and takes the thrust of a rotatable assembly in a dynamoelectric machine is difficult to achieve, particularly if the lubricant supply or feed to such sliding type bearing is by lubricant wicking means rather than by a pressurized lubricant source.

In order to overcome the aforementioned disadvantageous or undesirable feature involving wick feeding of lubricant to the past sliding type bearing, many of such sliding type bearings were formed of a compressed powder material, such as a sintered powder metal or the like for instance. Of course, the sintered powder metal of these past sliding type bearings was somewhat porous having interstices therein generally defining capillary lubricant flow passages or capillary paths through such bearings communicating with all of the surfaces thereof. Thus, with respect to lightly loaded surfaces or interfaces of the past sintered powder metal bearing, such as a bore or journaling surface thereof for instance, lubricant exuded or flowed from the capillary paths in such bearing so as to lubricate such lightly loaded surface or interface. Further, if the porosity of the past sintered powder metal bearing was considerable, lubricant may have been stored therein. However, it is believed the sintered powder metal bearing has a serious disadvantageous or undesirable feature when a surface thereof is subjected to high loading forces. For instance, while the capillary paths permitted the egress therefrom of lubricant, as discussed above, lubricant also ingressed into the capillary paths; therefore, when a surface of the sintered powder metal bearing was highly loaded, i.e., in thrust transfer engagement with a thrust collar or the like for instance, any lubricant on such highly loaded surface may have been forced therefrom into the capillary paths communicating with such surface due to the thrust transfer engagement thereby to obviate the possibility of establishing at least a partial hydrodynamic film of lubricant between the highly loaded surface and the thrust collar.

In some of the past sintered powder metal sliding type bearings, the surfaces thereof subjected to high load were treated in order to completely close the capillary paths communicating with such highly loaded surfaces. For instance, it is well known to the art to infiltrate these high load surfaces with a fluid, such as a liquid resin or a molten metal or the like, with such fluid penetrating and solidifying in the capillary paths of the bearing communicating with such high load surfaces thereby to completely close such capillary paths and obviate lubricant ingress and egress therethrough. With the capillary paths closed, as discussed above, it is, of course, then possible to establish a hydrodynamic film of lubricant between the high load surface and the aforementioned thrust collar associated in thrust transfer relation therewith. However, one of the disadvantageous or undesirable features of this above discussed fluid method of closing capillary paths to the highly loaded surface is believed to be that such method may have been somewhat slow and laborious thereby increasing production costs. Another disadvantageous or undesirable feature of this above discussed method is believed to be that the application of the liquid resin or molten metal to the high load surface of the bearing may have been rather messy in a production area and may have involved hazardous working conditions in such production area.

SUMMARY OF THE INVENTION

Among the several objects of the present invention may be noted the provision of an improved dynamoelectric machine which overcomes the above discussed disadvantageous or undesirable features, as well as others, of the prior art; the provision of such improved dynamoelectric machine utilizing a sliding type bearing formed of compressed powder material having capillary paths defined therein through which lubricant flow may be predeterminately regulated to accommodate a preselected load application on the sliding type bearing; the provision of such improved dynamoelectric machine in which at least one load surface of the sliding type bearing is mechanically worked to predeterminately at least restrict at least some of the capillary paths communicating with such at least one load surface thereby to achieve the predetermined regulation of the lubricant flow therethrough; the provision of such improved dynamoelectric electric machine and in which other capillary paths communicating with at least one depression in the at least one load surface is also mechanically worked to predeterminately at least restrict at least some of such other capillary paths thereby to achieve the predetermined regulation of the lubricant flow therethrough; the provision of such dynamoelectric machine and in which a sliding type bearing and dynamoelectric machine end shield are arranged in an enhanced force transfer relation; and the provision of such dynamoelectric machine and utilizing components which are simplistic in design, economically manufactured and easily assembled. These as well as other objects and advantageous features of the present invention will be in part apparent and in part pointed out hereinafter.

In general, and in one form of the invention, a dynamoelectric machine has a stationary assembly and a rotatable assembly, and at least one end shield is mounted in association with the stationary assembly. The at least one end shield includes a partial spherical seating surface formed integrally therewith, and at least a pair of keys are integrally formed on the at least one end shield and extend generally radially so as to intersect with the partial spherical seating surface. Bearing means for journaling a part of the rotatable assembly has a partial spherical bearing surface peripherally arranged about the bearing means and interposed between a pair of opposite end portions on the bearing means, and the partial spherical bearing surface is disposed in engagement with the partial spherical seating surface on the at least one end shield. At least a pair of keyways in one of the opposite end portions of the bearing means extend generally radially to intersect with the partial spherical bearing surface, respectively, and the at least keyway pair receive therein the at least key pair so as to retain the partial spherical bearing surface on the bearing means generally against rotational displacement with respect to the partial spherical seating surface on the at least one end shield.

BRIEF DESCRIPTION OF THE DRAWINGS

Corresponding reference characters indicate corresponding parts throughout the several views of the drawings.

The exemplifictions set out herein illustrate the preferred embodiments of the invention in one form thereof, and such exemplifications are not to be construed as limiting the scope of the invention in any manner.

DETAILED DESCRIPTION OF THE PREFERRED EMBODIMENTS

Figures 1, 2, 3, 4:
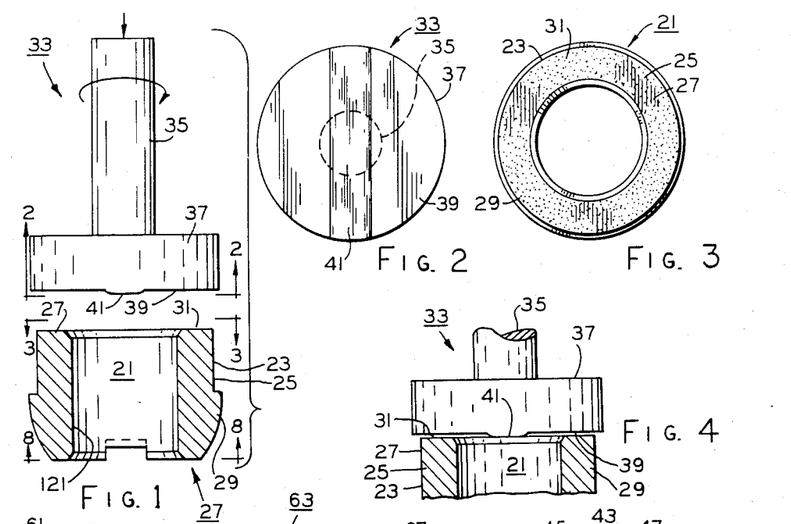
FIG. 1 is a partial sectional view showing a tool disposed for working engagement with a bearing and illustrating principles which may be practiced in a method of forming a bearing and a method of manufacturing a dynamoelectric machine, respectively.
FIGS. 2 and 3 are elevational views taken along lines 2—2 and 3—3 of FIG. 1, respectively.
FIG. 4 is a partial sectional view of the bearing and tool of FIG. 1 showing a rib of the tool in rubbing engagement with a thrust taking surface of the bearing.
Figures 5, 6, 7:
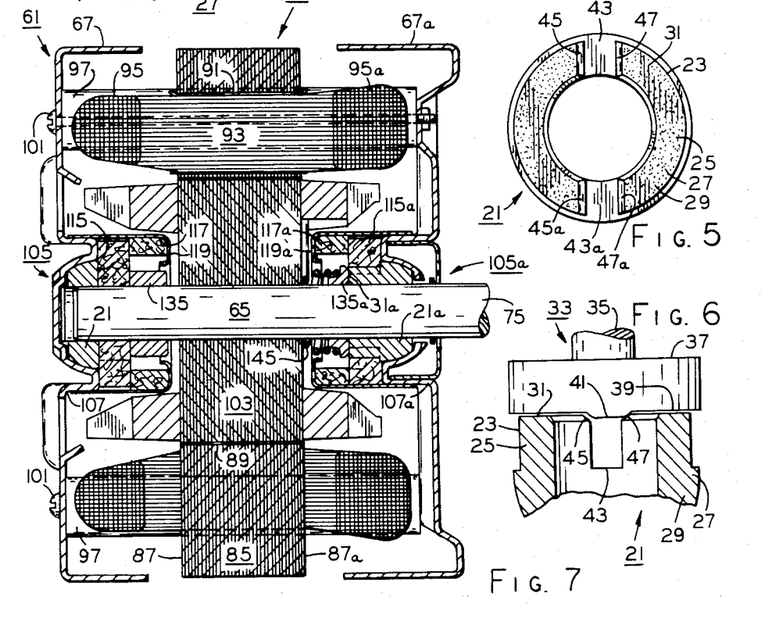
FIG. 5 is an elevational view illustrating the thrust surface of the bearing of FIG. 1 having opposite notches and chamfers therein.
FIG. 6 is another partial view of the tool of FIG. 1 showing its rib in rubbing engagement with a chamfer adjacent the notch in the thrust taking surface of the bearing of FIG. 5 thereby to illustrate principles which may be practiced in an alternative method of forming a bearing.
FIG. 7 is a sectional view showing a dynamoelectric machine in one form of the invention.

With reference to the drawings in general, there is illustrated a method of forming a bearing 21 having a body 23 of compressed powder material 25 (FIGS. 1-6). Bearing body 23 includes a plurality of surfaces, indicated generally at 27, and compressed powder material 25 of the bearing body has a matrix or plurality of interstices defining a plurality of capillary paths or passage means 29 for lubricant flow extending through the bearing body so as to communicate or otherwise intersect with the surfaces of the bearing body, respectively (FIGS. 1 and 6). In this method, at least some of compressed powder material 25 of at least one of surfaces 27, such as a generally annular and generally planar thrust or thrust taking surface 31 or the like for instance, is mechanically worked to predeterminately at least restrict at least some of capillary passage means 29 communicating with the thrust taking surface (FIGS. 4 and 6). Due to the aforementioned at least restriction of at least some of capillary passage means 29 communicating with thrust taking surface 31 of bearing body 23, lubricant flow rate is predeterminately regulated or otherwise controlled through the capillary passage means communicating with the thrust taking surface of the bearing body.

More particularly and with specific reference to FIGS. 1-6, it is believed that a number of various different sliding type bearings, such as a sleeve bearing or a self-aligning bearing 21 or the like for instance, have been manufactured or otherwise formed by various different powder metallurgy processes. For example, one such process is in the M. D. Tupper U.S. Pat. No. 3,109,684 issued Nov. 5, 1963 and U.S. Pat. No. 3,166,959 issued Jan. 26, 1965, and each of these patents is incorporated herein by reference. Compressed powder material 25 comprises a mixture of a metallic powder, such as powdered iron or the like for instance, which is substantially free of impurities, and a filler, such as graphite or the like for instance. In the preferred embodiment, the mixture contains a minimum of generally about ninety-six percent (96%) powdered iron with generally between about two to three percent (2%–3%) graphite. While compressed powder material 25 and mixtures thereof were utilized in the preferred embodiment, it is contemplated that other mixtures of other metals, metal alloys and other fillers, as well as various different percentages of such other mixtures, may be employed to form bearings within the scope of the invention so as to meet at least some of the objects thereof.

Briefly discussing an exemplary method of molding a bearing, the mixture of the powder material may be placed in a mold cavity having a desired bearing configuration, such as that of bearing body 23 or the like for instance, of a conventional powder metal molding press where the material may be pressed or otherwise compacted into a semifinished or so-called "green" powder bearing. This semifinished compacted bearing may then be placed into a standard sintering oven and sintered or fired whereupon the fired material becomes a unitary substantially rigid body. If desired or if necessary, the fired bearing may be subsequently subjected to various different sizing operations, such as for example additional compaction in a sizing mold or the like. While the exemplary method briefly discussed above may be employed to mold bearing 21, it is contemplated that other different methods having different steps may be employed to effect the formation of the bearing within the scope of the invention so as to meet at least some of the objects thereof. Regardless of the method used to mold bearing 21, it is believed that it is not possible to control the requisite predetermined permeability or regulation of the interconnecting size of the capillary paths of the bearing in the preferred embodiment by controlling the compacting of the compressed powder material of the bearing during the formation thereof. Therefore, in order to predetermine the degree of lubrication or permeability at thrust taking surface 31 of bearing 21, the bearing must be further processed to at least restrict the size of at least some of capillary passages 29 communicating with the thrust taking surface of the bearing.

In order to effect regulation of the permeability of bearing 21 through capillary passages 29 of bearing body 23 to at least thrust taking surface 31 thereof, the bearing body is located or otherwise positioned or disposed in a fixture (not shown) with the thrust taking surface arranged so as to be mechanically worked, as illustrated in FIG. 1. A tool or tool means, indicated generally at 33 includes a stem or chucking portion 35 adapted to be secured for rotation in suitable equipment means, such as a rotatable and vertically movable arbor or the like for instance (not shown), and a generally circular head 37 having a generally planar face 39 is integrally formed with the stem of the tool, FIG. 2. Means, such as a rib 41 of a hardened material or the like for instance, is secured or otherwise mounted in face 39 of tool 33 for rubbing or mechanically working thrust taking surface 31 of bearing body 23. The length of tool rib 41 is preselected so as to extend at least generally radially across the radial extent of generally annular thrust taking surface 31, and the tool rib has a generally cylindric or semicircular configuration or cross section between its opposite ends; however, while tool face 39 and tool rib 41 are illustrated and discussed herein as having a specific configuration for purposes of disclosure, it is contemplated that other tool faces and tool ribs having other configurations and lengths may be utilized within the scope of the invention so as to meet at least some of the objects thereof. Furthermore, while rubbing tool 33 is illustrated herein for purposes of disclosure, it is contemplated that other tools, such as for instance a roller burnishing tool or the like, may be utilized to effect mechanical working of bearing body 23 in one form of the invention so as to meet at least some of the objects thereof. With bearing body 23 located in its fixture (not shown) and tool 33 arranged so as to be rotatable with respect to the bearing body, the tool is moved downwardly (as best seen in FIG. 4) so as to rotatably engage rib 41 thereon in working engagement with thrust taking surface 31 of the bearing body. With tool 33 being rotated at a preselected speed and having a preselected force applied thereto to effect the rotating engagement of tool rib 41 with thrust taking surface 31 of bearing body 23, at least some of sintered powder metal 25 at the thrust taking surface is mechanically worked or otherwise deformed or displaced with respect to at least some of capillary passages 29 of bearing body 23 communicating with the thrust taking surface thereof. In other words, tool rib 41 is rubbed against thrust taking surface 31 of bearing body 23 so as to, in effect, smear or wipe sintered powder metal 25 on the thrust taking surface to a preselected degree or amount which effects at least a restriction or reduction in size of at least some of capillary passages 29 at least generally at the juncture thereof with the thrust taking surface. Of course, in practicing this method, the parameters involved in predetermining the permeability of thrust taking surface 31, i.e., predetermining the restriction of capillary passages 33 are: the force of the rubbing engagement; tool speed and number of rotations thereof during the rubbing engagement; and the general size of the capillary passages created during the above discussed molding of the bearing. Thus, by predetermining the force of the rubbing engagement between tool rib 41 and thrust taking surface 31 of bearing body 23, the rotational speed of tool 33, and the number of rotations thereof, the restriction or reduction in size of capillary passages 29 communicating with the thrust surface may be regulated so as to control or otherwise predetermine the permeability of bearing 21 at its thrust taking surface, i.e., to generally predetermine lubricant flow rate through the capillary passages communicating with the thrust taking surface in accordance with the particular application of the dynamoelectric machine in which bearing 21 may be utilized. Furthermore, the above discussed mechanical working of thrust taking surface 31 of bearing body 23 may, if desired, be carried out to a degree wherein deformed sintered powder metal 25 is smeared over or otherwise deposited in capillary passages 29 intersecting with the thrust taking surface so as to close or seal such capillary passages. The degree to which capillary passages 29 are predeterminately restricted or closed, as discussed above, depend upon which of the three known types of lubrication is desired at thrust taking surface 31, i.e. boundary lubrication, a hydrodynamic layer lubrication, or partial hydrodynamic lubrication; and, such lubrication types depend, of course, upon the particular load to which such thrust taking surface may be predictably subjected in any given dynamoelectric machine application. In some instance after tool 33 has been rotated in one direction, say for instance the clockwise direction, in rubbing engagement with thrust taking surface 31 of bearing body 23, it may be desirable to reverse the rotation of the tool so as to also effect the rubbing of the thrust taking surface in the clockwise direction. While the mechanical working of thrust taking surface 31 of bearing body 23 is discussed above within the context of rotating only tool 33, it is contemplated that only the bearing body may be rotated moving the thrust taking surface into rubbing engagement with rib 41 on a stationary tool and also that both the tool and the bearing body may be rotated with either being moved to effect the rubbing engagement within the scope of the invention so as to meet at least some of the objects thereof. Further, while only one tool rib 41 is shown and described hereinabove on tool 33, it is contemplated that a tool having a plurality of such ribs spaced angularly thereabout may be utilized within the scope of the invention so as to meet at least some of the objects thereof.

In an alternative method of forming bearing 21 as illustrated in FIGS. 5 and 6, the components utilized in performing the alternative method and the steps thereof are generally the same as that of the previously discussed method with the exceptions noted hereinafter.

While bearing 21 has been discussed hereinabove within the context of thrust taking surface 31 having a generally annular and planar configuration, it may be noted that the thrust taking surface may be provided with at least one means, such as notch or slot 43 or the like for instance, for receiving a part of a feeder wick device, as discussed in greater detail hereinafter, and a pair of indentations or depressions, such as bevels, ramps or chamfers 45, 47 or the like for instance, are provided in the thrust taking surface adjacent opposite sides of notch 43 therein. Chamfers 45, 47 are predeterminately disposed so as to extend generally radially completely across the radial extent of generally annular thrust taking surface 31 and also to extend a predetermined depth into the thrust taking surface. Of course, with chamfers 45, 47 provided in thrust taking surface 31, it is also desirable to associate tool rib 41 in rubbing engagement with the chamfers to at least restrict capillary passages 29 intersecting with the chamfers. In order to effect the rubbing of chamfers 45, 47, rib 41 of tool 33 is moved downwardly into notch 43 in rubbing engagement with chamfer 45 generally as the tool rib is rotated about thrust taking surface 31 in the rubbing engagement therewith, as shown in FIG. 6. Thus, due to the downward movement of tool 33, it may be noted that the rib 41 extends or is spaced from face 39 of the tool a distance greater than the aforementioned predetermined depth of chamfers 45, 47 to obviate interfering engagement between the tool face and the thrust taking surface when the tool rib is so translated from its rubbing engagement with the thrust taking surface to its rubbing engagement with chamfers 45, 47. After tool rib 41 is rubbed across chamfer 45, continued rotation of tool 33 translates or rotates the tool rib across notch 43 into rubbing engagement with chamfer 47 and thereacross back into rubbing engagement with the thrust taking surface. Of course, tool 33 may be programmed by suitable means to enter into notch 43 no more than generally about the predetermined depth of chamfers 45, 47. In this manner, upon each rotation of tool rib 41 in rubbing engagement about thrust taking surface 31, chamfers 45, 47 are also rubbed to effect at least restriction of at least some capillary passages 29 intersecting therewith. Although only notch 45 and its chamfers 45, 47 are discussed with respect to bearing 21, it is contemplated that additional notches and associated chamfers may be employed in the bearing and rubbed to at least restrict capillary passages intersecting therewith within the scope of the invention so as to meet at least some of the objects thereof.

Figures 8, 9:
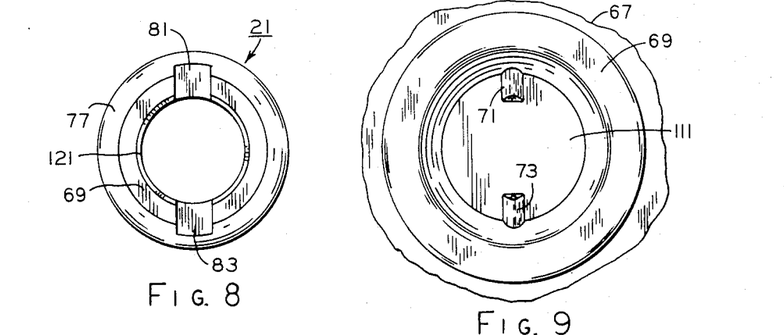
FIG. 8 is an elevational view taken along line 8—8 of FIG. 1.
FIG. 9 is a partial sectional view taken along line 9—9 of FIG. 7.
Figures 10, 11, 12, 13:
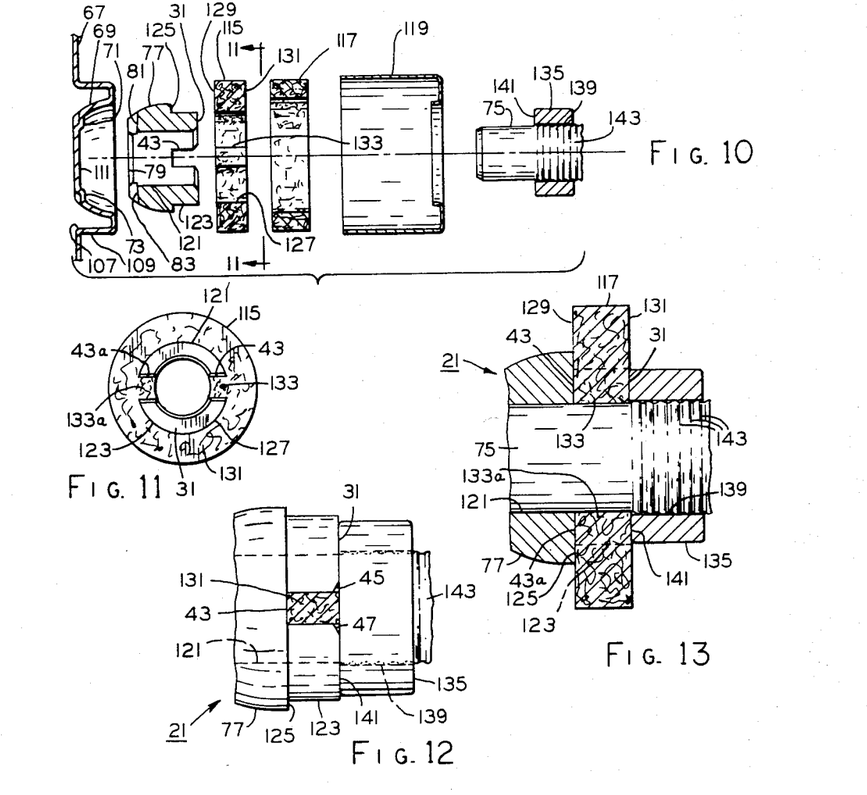
FIG. 10 is an exploded view of some of the components of the dynamoelectric machine of FIG. 7 illustrating principles which may be practiced in a method of manufacturing a dynamoelectric machine and also in a method of fabricating a bearing and lubrication system in a dynamoelectric machine and operating the system, respectively.
FIG. 11 is a partial sectional view taken along line 11—11 of FIG. 10.
FIG. 12 is a greatly enlarged, partial view taken from FIG. 7 with the feeder wick partially broken away to illustrate the establishment of lubrication between the bearing thrust surface and the thrust device.
FIG. 13 is a sectional view taken along line 13—13 of FIG. 12.

With reference again in general to the drawings and recapitulating in part with respect to the foregoing, a dynamoelectric machine 61 has a stationary assembly 63 and a rotatable assembly 65 (FIG. 7). An end shield 67 is mounted in association with stationary assembly 63 and includes a partial spherical seating surface 69 formed integrally therewith, and a pair of keys or lands 71, 73 are also integrally formed on the end shield extending generally radially so as to intersect with the seating surface (FIG. 9). Bearing or bearing means 21 arranged for journaling a part, such as a shaft 75 for instance, of rotatable assembly 65 includes a partial spherical bearing surface 77 peripherally arranged about the bearing between a pair of opposite ends thereof, such as thrust taking surface 31 and a locking surface 79, and the bearing surface is disposed in engagement with seating surface 69 on end shield 67 (FIGS. 7 and 10). A pair of keyways or grooves 81, 83 recessed into locking end 77 of bearing 21 extend generally radially to intersect with bearing surface, respectively, and the keyway pair receive therein key pair 71, 73 so as to retain the bearing surface generally against rotational displacement with respect to the engagement thereof with seating surface 69 (FIGS. 8-10).

More particularly and with specific reference to FIG. 7, stationary assembly 63 comprises a ferromagnetic core or stator 85 having a pair of generally opposite ends or end faces 87, 87a which are respectively intersected by a bore 89 extending generally axially through the stator. A plurality of generally radially disposed winding means accommodating slots 91 are also provided in stator 85 respectively intersecting with both stator bore 89 and stator end faces 87, 87a. Winding means 93, such as a plurality of conductor turns or coils thereof, is disposed in slot plurality 91 having suitable insulation therebetween, and the winding means has a pair of opposite, generally annular groupings of end turns 95, 95a thereof disposed generally about stator bore 89 adjacent stator end faces 87, 87a, respectively. A plurality of beams or the like, such as shown at 97 for instance, are associated or otherwise fixedly secured to stator 85 generally adjacent its outer peripheral portion, and the opposite ends of the beams are abutted against a pair of structural components, such as end shields 67, 67a or the like for instance, thereby to predeterminately space the end shields from stator end faces 87, 87a, respectively. If a more detailed discussion of the securement of beams 97 to stator 85 is desired, reference may be had to U.S. Pat. No. 3,858,067 issued Dec. 31, 1974 to Charles W. Otto and which is incorporated herein by reference. In order to retain end shields 67, 67a in abutment with the opposite ends of beams 97, a plurality of through bolt assemblies 101 extend through the beams and are interconnected with the end shields, respectively. Although stationary assembly 65 is illustrated herein as having a particular construction, it is contemplated that other stationary assemblies having various other constructions may be utilized in dynamoelectric machine 61 within the scope of the invention so as to meet at least some of the objects thereof.

Rotatable assembly 65 comprises a ferromagnetic core or rotor 103 which may, if desired, be of the squirrel-cage type, and the rotor is mounted on shaft 75 so as to be conjointly rotatable therewith. Rotor 103 is rotatably disposed within bore 89 of stator 85 so as to be arranged in magnetic coupling relation with winding means 93 of the stator upon the excitation of the winding means when dynamoelectric machine 61 is selectively energized across a power source (not shown). Opposite end portions of rotor shaft 75 are associated with a pair of lubrication and bearing systems 105, 105a which are supported on end shields 67, 67a, respectively; and since end shields 67, 67a and the components of lubrication and bearing systems 105, 105a are generally the same, only end shield 67 and lubrication and bearing system 105 will be discussed hereinafter in detail although corresponding components of end shield 67a and system 105a will be designated by the letter "a".

End shield 67 is formed or otherwise stamped or punched from a sheet metal material, such as a sheet steel or the like for instance. A generally central hub or recess portion 107 of end shield 67 is integrally deformed therefrom. Recess portion 107 has a generally cyclindric axially extending sidewall 109, and a base wall 111 of the recess portion is integral with the sidewall. A generally central part of base wall 111 defines partial spherical bearing seat or seating surface 69 which at least in part is generally axially coextensive with sidewall 109 being spaced radially inwardly therefrom. Keys 81, 83 are also integrally deformed from base wall 111 so as to extend or protrude past or from partial spherical seating surface 69 of the base wall, and the keys are oppositely spaced apart so as to extend generally radially with respect to each other.

Lubrication and bearing system 105 comprises bearing 21, a lubricant feeder wick device 115, a lubricant storage wicking material 117 and means, such as a cover or containers 119 or the like for instance, for containing at least the lubricant storage wicking material. A shaft receiving or journaling bore 121 extends generally axially through bearing body 23 intersecting with opposite thrust taking surface 31 and locking surface 79 thereof, and partial spherical bearing surface 77 extends peripherally about the bearing body intersecting with the locking surface. A generally cylindric surface 123, which also extends peripherally about bearing body 23, has one end intersecting with thrust taking surface 31, and a generally radially extending shoulder 125 on the bearing body is interposed between the other end of the cylindric surface and partial spherical bearing surface 77. Thus, opposite notches 43, 43a in bearing body 23 intersect with bore 121 and cylindric surface 123 thereof as well as with thrust taking surface 37, and chamfers 45, 47 and 45a, 47a interposed between notches 43, 43a and thrust taking surface 31 also intersect with the bore and the cylindric surface of the bearing body. It may be noted that keyways 81, 83 are provided in locking surface 79 of bearing body 23 extending generally radially and oppositely so as to intersect between partial spherical bearing surface 77 and bore 121 of the bearing body. Therefore, when partial spherical bearing surface 77 of bearing 21 is engaged with partial spherical seating surface 69 of end shield 67, it may also be noted that keys 71, 73 integral with the end shield are received in antirotational yet self-adjusting engagement within keyways 81, 83 provided therefor in the bearing thereby to obviate rotational movement of partial spherical bearing surface 77 of the bearing in its seating engagement with the partial spherical seating surface of the end shield, as discussed hereinafter. Although the engagement of keys 71, 73 and keyways 81, 83 obviate rotation of bearing 21, as discussed above, such engagement of the keys and keyways does permit at least a limited amount of self-adjusting movement of partial spherical bearing surface 77 of bearing 21 on partial spherical seating surface 69 of end shield 67. While a pair of interlocking keys 71, 73 and keyways 81, 83 are illustrated herein, it is contemplated that a greater or lesser number thereof may employed in antirotational yet self-adjusting engagement within the scope of the invention so as to meet at least some of the objects thereof. While bearing surface 77 of bearing 21 is disclosed as being a partial spherical surface, it is contemplated that other bearing surfaces, such as for instance a partial toroidal surface or the like, may be utilized on the bearing within the scope of the invention so as to meet at least some of the objects thereof.

Feeder wick 115 is generally annular in shape having an opening 127 extending axially therethrough between a pair of opposite faces 129, 131, and a pair of opposite wiping fingers or extensions 133, 133a on the feeder wick extend generally radially between the opposite faces thereof into opening 125. Feeder wick 115 may be formed of a suitable composition or material, such as felt or the like for instance. When feeder wick 115 is assembled with bearing 21, opening 127 is disposed about cylindric surface 123 of bearing body 23, and wiping fingers 131, 131a of the feeder wick are positioned in notches 43, 43a of the bearing body protruding slightly into bore 121 thereof. Feeder wick 115 is dimensioned so that when face 129 thereof is seated against shoulder 125 of bearing body 23, opposite face 131 of the feeder wick extends slightly past thrust taking surface 31 of the bearing body. Thus, it may be noted that wiping fingers 133, 133a extend beyond thrust taking surface 31 and bore 121 of bearing body 23 for lubricant wiping engagement with shaft 75 and a pair of thrust devices 135, 135a associated therewith, as discussed in greater detail hereinafter. Generally annular container or open-ended cup-shaped member 119, such as a sleeve, or the like for instance, has one end thereof secured by suitable means, such as crimping or swedging or the like for instance, about sidewall 109 on hub portion 107 of ehd shield 67, and container 119 extends generally coaxially from the hub portion so that the opposite or free end of the container is disposed axially beyond thrust devices 135, 135a. Lubricant storage wicking material 117 may be formed of any suitable material, such as for instance an absorbent wool or "GE Lube" available from the General Electric Company, Fort Wayne, Ind. Storage wicking material 117 may be manually placed or injected into position within container 119 extending thereabout adjacent the free end of the container so as to be in lubricant transfer relation with face 131 of feeder wick 115.

Thrust devices or thrust collars 135, 135a may be formed of any suitable material, such as a ferrous material or the like for instance, and are provided with generally axial bores or openings 139, 139a therethrough intersecting with thrust bearing faces or surfaces 141, 141a thereon, respectively. Opening 139 in thrust collar 135 is gripped in engagement with a plurality of ridges 143 provided in shaft 75 so that thrust face 141 of thrust collar 135 is predeterminately located in bearing engagement with thrust taking surface 31 of bearing 21. If a more detailed explanation of thrust collar 135 and its engagement with shaft ridges 143 is desired, reference may be had to U.S. Pat. No. 4,215,287 issued July 29, 1980 to Charles W. Otto which is incorporated herein by reference. Opening 139a in thrust collar 135a is slidably arranged on shaft 75, and a coil spring 145 is biased between end face 87a of rotor 103 and thrust collar 135a urging thrust face 141a thereof into bearing engagement with thrust taking surface 31a of bearing 21a. If a more detailed discussion of coil spring 145 and its arrangement with shaft 75, rotor 103 and thrust device 135a is desired, reference may be had to the aforementioned Charles W. Otto application Ser. No. (377,678) filed May 12, 1982 (now abandoned) concurrently with this application. To complete the description of dynamoelectric machine 61, both thrust collars 135, 135a are disposed on rotatable assembly 65 so as to be conjointly rotatable therewith, and it may be noted that the compressive force of spring 145 not only urges thrust collars 135 135a toward engagement with thrust taking surfaces 31, 31a of bearing 21, 21a but also accommodates or compensates for variance in end play of rotatable assembly 65 in dynamoelectric machine 61. While thrust collars 135, 135a and their securement with shaft 75 and rotor 103 are illustrated herein for purposes of disclosure, it is contemplated that other thrust collars secured in different manners may be utilized within the scope of the invention so as to meet at least some of the objects thereof.

In the operation of dynamoelectric machine 61, assume that the component parts thereof are positioned as described hereinabove and as shown in FIG. 7. When dynamoelectric machine 61 is energized across a power source (not shown), winding means 93 of stator 85 is, of course, excited or energized, and since rotor 103 is arranged in magnetic coupling relation with the winding means such energization of the dynamoelectric machine effects conjoint rotation of the rotor and shaft 75. The rotation of shaft 75 in bore 121 of bearing 21 effects a flow of lubricant from storage wicking material 117 in lubrication and bearing system 105 to feeder wick 115 which has its face 131 in abutment or lubricant transfer relation with the storage wicking material. From feeder wick 115, lubricant flows through wiping fingers 133, 133a to shaft 75 within bore 121 of bearing 21, and the lubrication of the shaft in the bearing bore is believed to be of the boundary type since the load of the shaft on the bearing bore is relatively light. Since some of capillary passages 29 in bearing 21 communicate or open into bore 121 thereof, lubricant within the bearing bore may escape or egress therefrom through the capillary passages in response to the bearing or journaling engagement of shaft 75 in the bearing bore; thus, it is believed that only boundary type lubrication is effected between the shaft and the bearing bore. Of course, lubricant may also be stored within capillary passages 29 of bearing 21 and/or flowed therethrough to all the surfaces of surface plurality 27 of bearing 21 with such flow being at least restricted to thrust taking surface 31, as discussed hereinafter.

Assuming that capillary passages 29 in bearing 21 intersecting with thrust taking surface 31 have been closed or so restricted to inhibit flow therethrough, as previously discussed, then it may be noted that the wiping engagement of feeder wick fingers 133, 133a with thrust face 141 of thrust collar 135 is effective to establish lubricant flow therebetween. Since lubricant can not escape through the closed or restricted capillary passages 29 intersecting with thrust taking surface 31 of bearing 21, the lubricant transferred from feeder wick fingers 133, 133a to thrust collar face 141 is effective to establish at least a partial hydrodynamic film of the lubricant between the bearing thrust taking surface and the thrust collar face. In this manner, the established hydrodynamic film of lubricant between bearing thrust taking surface 31 and thrust collar face 141 accommodates or lubricates the running or bearing engagement of thrust collar 135 on bearing 21 occasioned by end play movement of rotatable assembly 65 with respect to end shields 67, 67a of stationary assembly 63 upon the energization of dynamoelectric machine 61. Of course, lubricant flow through lubrication and bearing system 105a is effected in the same manner as described above to establish a hydrodynamic film of lubricant between thrust taking surface 31a of bearing 21a and face 141a of thrust collar 135a. As lubricant is passed from feeder wicks 115, 115a to thrust collars 135, 135a to maintain the established hydrodynamic film of the lubricant, some of the lubricant may be thrown or otherwise displaced by the rotating thrust collars generally radially outwardly thereof toward a part of storage wicking materials 117, 117a disposed generally coaxially about the thrust collars. In this manner, any lubricant so returned to storage wicking material 117, 117a may be recirculated or redistributed through lubrication and bearing systems 105, 105a in the same manner as discussed hereinabove.

While the above discussed operation of dynamoelectric machine 61 is based upon the establishment of a hydrodynamic film of lubricant between bearings 21, 21a and thrust collars 135, 135a, respectively, it is contemplated that a boundary or partial hydrodynamic type of lubrication may alternatively be established therebetween if the duty or application of the dynamoelectric machine will accommodate such alternative types of lubrication, as previously mentioned.

From the foregoing, it is now apparent that a novel dynamoelectric machine 61 has been presented meeting the objects and advantageous features set out hereinbefore, as well as others, and that changes as to the precise arrangements, shapes, details and connections of the components utilized in such dynamoelectric machine, may be made by those having ordinary skill in the art without departing from the spirit of the invention or the scope thereof, as set out in the claims which follow.

What I claim as new and desire to secure by Letters Patent of the United States is:

1. A dynamoelectric machine adapted for connection across a power source comprising:
   a stator having winding means associated therewith for excitation when the dynamoelectric machine is connected across the power source;
   a rotor arranged in magnetic coupling relation with said stator so as to be rotatable upon the excitation of said winding means;
   a shaft rotatably mounted with said rotor;
   at least one thrust device associated with at least one of said rotor and said shaft so as to be rotatable therewith;
   at least one sheet metal end shield mounted in association with said stator and including a partial spherical bearing seating surface deformed from said at least one sheet metal end shield, and at least a pair of keys deformed from said at least one sheet metal end shield so as to extend generally radially with respect to said partial spherical bearing seating surface, respectively;
   a lubrication and bearing system including a bearing having a body of sintered metal material with a plurality of capillary passage means for lubricant flow extending therethrough defined between the interstices of the sintered metal material, a pair of opposite ends on said bearing body, a partial spherical bearing surface extending peripherally about said bearing body at least adjacent one of said opposite ends and engaged in at least limited self adjusting relation with said partial spherical bearing seating surface on said at least one sheet metal end shield, a bore in said bearing body extending generally axially between said opposite ends thereof and arranged in journaling engagement with a part of said shaft, at least a pair of keyways in said bearing body intersecting with said one opposite end and extending between said bore and said partial spherical bearing surface, respectively, said at least key pair deformed from said at least one sheet metal end shield being received within said at least keyway pair in antirotational engagement with said bearing body, a generally cylindric surface extending peripherally about said bearing body between said partial spherical bearing surface and the other of said opposite ends of said bearing body, at least one notch in said bearing body intersecting with said other opposite end thereof and extending between said bore and said cylindric surface, said other opposite end defining a thrust surface on said bearing body arranged in thrust transfer relation with said thrust device on said shaft and being mechanically worked to at least in part close at least some of said capillary passage means associated with said thrust surface and thereby predeterminately regulate lubricant flow through said capillary passage means terminating at said thrust surface, a lubricant feeder wick associated with said bearing body and having at least one part disposed within said at least one slot and extending into lubricant wiping engagement with both said shaft part within said bore and said thrust device on said shaft, a lubricant storage wicking material arranged in lubricant transfer relation with said lubricant feeder wick, and means connected with said at least one sheet metal end shield generally radially outwardly of said partial spherical bearing seating surface formed thereon and extending generally toward said rotor for containing said lubricant storage wicking material, the lubricant being transferred from said lubricant storage wicking material through both said capillary passage means in said bearing body and said lubricant feeder wick into said bore of said bearing body to lubricate said shaft part journaled therein and also through said at least one part of said lubricant feeder wick to said thrust device to establish a hydrodynamic film of the lubricant between said thrust surface on said bearing body and said thrust device.

2. A dynamoelectric machine adapted to be connected across a power source comprising:
a stationary assembly including winding means for excitation when the dynamoelectric machine is connected across the power source;
a rotatable assembly arranged in magnetic coupling relation with said stationary assembly so as to be rotatable upon the excitation of said winding means;
at least one sheet metal end shield mounted in association with said stationary assembly and including a partial spherical bearing seating surface deformed integrally therefrom, and at least a pair of keys integrally deformed from said at least one sheet metal end shield and extending generally radially of said partial spherical bearing seating surface; and
self-adjusting bearing means for journaling a part of said rotatable assembly and including a bearing surface interposed between a pair of opposite end portions and extending generally circumferentially about said bearing means, said bearing surface being disposed in at least limited self adjusting engagement with said partial spherical bearing seating surface on said at least one sheet metal end shield, and at least a pair of keyways in one of said opposite end portions and extending generally radially thereof to intersect with said bearing surface, said at least key pair integrally deformed from said at least one sheet metal end shield being received within said at least keyway pair in rotational displacement preventing engagement with said bearing means.

3. A dynamoelectric machine comprising:
a stationary assembly;
a rotatable assembly;
at least one end shield mounted in association with said stationary assembly and including a partial spherical seating surface formed integrally therewith, and at least a pair of keys integrally formed on said at least one end shield and extending generally radially so as to intersect with said partial spherical seating surface; and
bearing means arranged for at least limited self-adjusting movement on said at least one end shield and for journaling a part of said rotatable assembly said bearing means including a partial spherical bearing surface peripherally arranged thereabout and interposed between a pair of opposite end portions on said bearing means, said partial spherical bearing surface being disposed in at least limited self-adjusting engagement with said partial spherical seating surface on said at least one end shield, and at least a pair of keyways in one of said opposite end portions of the bearing means and extending generally radially to intersect with said partial spherical bearing surface, respectively, said at least keyway pair receiving therein said at least key pair so as to retain said partial spherical bearing surface on said bearing means generally against rotational displacement with respect to said partial spherical seating surfaces on at least one end frame while permitting the at least limited self-adjusting movement of said partial spherical bearing surface on said partial spherical seating surface of said at least one end shield.

4. A dynamoelectric machine adapted for connection across a power source comprising:
a stationary assembly;
a rotatable assembly including at least one thrust device;
at least one sheet metal end shield mounted in association with said stationary assembly and including a bearing seating surface formed integrally therewith, and at least a pair of keys integrally deformed from said at least one sheet metal end shield;
bearing means arranged for at least limited self-adjusting movement with respect to said at least one sheet metal end shield and for journaling a part of said rotatable assembly and including a body of compressed powder material, a peripheral bearing surface on said bearing body disposed in at least limited self-adjusting movement engagement with said bearing seating surface on said at least one sheet metal end shield, a pair of generally opposite end surfaces on said bearing body, said bearing body having a plurality of capillary path means for lubricant flow therethrough defined in the compressed powder material so as to communicate with at least said bearing surfaces and said opposite end surfaces of said bearing body, one of said opposite end surfaces being mechanically worked to predeterminately at least restrict at least some of said capillary path means communicating with said one end surface thereby to predeterminately regulate the lubricant flow through said capillary path means communicating with said one end portion and said one end portion also being disposed in thrust transfer relation at least adjacent said at least one thrust device of said rotatable assembly, and at least a pair of keyways in the other of said opposite ends of said bearing body, said at least keyway pair being arranged in abutment with said at least key pair so as to retain said peripheral bearing surface on said bearing body against rotational displacement on said bearing seating surface of said at least one sheet metal end shield and permit the at least limited self-adjusting movement engagement therebetween; and means associated with both said bearing means and said at least one thrust device of said rotatable assembly for effecting at least a boundary lubrication of the rotatable assembly part journaled therein and also for effecting the establishment of a hydrodynamic film of lubricant between said one opposite end surface of said bearing body and said at least one thrust device of said rotatable assembly in the thrust transfer relation thereof.

5. A dynamoelectric machine adapted for connection across a power source comprising:

a stationary assembly;

a rotatable assembly including at least one thrust device;

at least one end shield mounted in association with said stationary assembly and including a bearing means seating surface thereon;

bearing means for journaling a part of said rotatable assembly and engaged with said seating surface on said at least one end shield, said bearing means including a body of compressed powder material, a plurality of surfaces on said bearing body, and a plurality of capillary passage means for lubricant flow defined within said compressed powder material so as to communicate with said surfaces, and one of said surfaces comprising a thrust taking surface arranged in thrust transfer relation with said at least one thrust device of said rotatable assembly and mechanically worked to predeterminately at least restrict at least some of said capillary passage means communicating with said thrust taking surface thereby to predeterminately regulate the lubricant flow through said capillary passage means communicating with said thrust taking surface; and means associated with both said bearing means and said at least one thrust device on said rotatable assembly for effecting at least boundary lubrication of the rotatable assembly part journaled in said bearing body and also for effecting the establishment of a hydrodynamic film of lubricant between said thrust taking surface of said bearing body and said at least one thrust device of said rotatable assembly in the thrust transfer relation thereof.

* * * * *